(12) United States Patent
Koyama et al.

(10) Patent No.: US 8,814,771 B2
(45) Date of Patent: Aug. 26, 2014

(54) TOOL HOLDING AND CONVEYING CHAIN

(75) Inventors: Tomoyuki Koyama, Osaka (JP); Michio Oitaka, Osaka (JP)

(73) Assignee: Tsubakimoto Chain Co., Osaka (JP)

(*) Notice: Subject to any disclaimer, the term of this patent is extended or adjusted under 35 U.S.C. 154(b) by 788 days.

(21) Appl. No.: 13/051,726

(22) Filed: Mar. 18, 2011

(65) Prior Publication Data
US 2011/0245053 A1    Oct. 6, 2011

(30) Foreign Application Priority Data

Mar. 31, 2010 (JP) ................................. 2010-081379

(51) Int. Cl.
    *B23Q 3/157*   (2006.01)
    *B23Q 3/155*   (2006.01)
    *B65G 1/12*    (2006.01)

(52) U.S. Cl.
    CPC .......... *B23Q 3/15526* (2013.01); *B23Q 3/1572* (2013.01); *B65G 1/12* (2013.01)
    USPC ............................. 483/68; 483/65; 211/1.56

(58) Field of Classification Search
    CPC ................................................. B23Q 3/15526
    USPC ........................ 483/68, 66, 65; 211/1.56, 70.6
    See application file for complete search history.

(56) References Cited

U.S. PATENT DOCUMENTS

| 4,182,021 A | * | 1/1980 | Kato et al. ....................... 483/68 |
| 4,858,980 A | * | 8/1989 | Dreisig et al. .................. 483/68 |
| 6,620,083 B2 | * | 9/2003 | Ninomiya et al. .............. 483/65 |

FOREIGN PATENT DOCUMENTS

| JP | 62-004122 |   | 1/1987 |
| JP | 62-074539 A | * | 4/1987 |
| JP | 63-76437 U |   | 5/1988 |
| JP | 01-153243 A | * | 6/1989 |
| JP | 7-7831 U |   | 2/1995 |

* cited by examiner

*Primary Examiner* — Erica E Cadugan
(74) *Attorney, Agent, or Firm* — Workman Nydegger

(57) ABSTRACT

There is provided a tool holding and conveying chain adapted to securely lock and position a tool pot, i.e., a connecting pin, to a pin hole of either an outer or inner link plate so that the tool pot does not to turn and to achieve steady and smooth attachment and removal of a tool in and out of the tool pot with a simple attachment structure. The tool pot has a pair of positioning flat portions formed by cutting a link plate attaching outer circumferential region of the tool pot and the outer link plate has a pair of positioning cooperative flat portions formed so as to bulge out of an inner circumference to a center of a pin hole. The positioning flat portions of the tool pot is fitted into and locked by the positioning cooperative flat portions when the tool pot is attached in the link plate.

4 Claims, 12 Drawing Sheets

FIG. 11

Alternative Arrangement Wherein the Inner Link Plate has Pin Holes, In each of Which a Pair of Positioning Cooperative Flat Portions Are Formed

TOOL HOLDING AND CONVEYING CHAIN

CROSS REFERENCE TO RELATED APPLICATIONS

This application claims the foreign priority benefit under Title 35, United States Code, §119 (a)-(d) of Japanese Patent Application No. 2010-081379, filed on Mar. 31, 2010 in the Japan Patent Office, the disclosure of which is herein incorporated by reference in its entirety.

BACKGROUND OF THE INVENTION

1. Field of the Invention

Embodiments of the present invention relate to a tool holding and conveying chain for holding and conveying tools for use in an auto-tool changer (ATC) mounted in a machining tool such as a machining center. More specifically, embodiments relate to a tool holding and conveying chain adapted so that connecting pins for alternately connecting outer link plates with inner link plates are used as tool pots for removably holding and conveying tools.

2. Related Art

An auto-tool changer mounted in a machining tool such as a machining center often employs a tool holding and conveying chain for holding a numbers of tools and for conveying the tools appropriately to tool replacing positions to replace the tools corresponding to machining to be carried out.

A conventional tool holding and conveying chain, as shown in FIGS. 9 and 10, is adapted so that cylindrical connecting pins 530 (also referred to herein as tool pots 530) for alternately connecting outer link plates 510 with inner link plates 520 are used as tool pots 530 for removably holding and conveying tools (not shown).

In order to insert and remove a tool T into and out of the tool pot 530 securely without causing positional misalignment, the prior art tool holding and conveying chain 500 is provided with holder guides 550 at regions connecting cylindrical connecting pins, i.e., the tool pots 530, with the outer link plates 510 so that the holder guides 550 are fixed on the outer surface of the outer link plates 510 corresponding to an adequate position of the tool pots 530 as shown in FIGS. 9 and 10. Thus, the chain 500 assures that the tool pot 530 does not turn relative to the outer link plate 510, which is prone to occur during when the chain travels a curved path corresponding to a layout of equipment of the auto-tool changer as disclosed in Japanese Utility Model Application Laid-open No. Hei.7-7831 (Whole Pages, Whole Drawings), for example.

Still more, as a prior art tool holding and conveying chain that securely prevents turning of the region connecting the cylindrical connecting pin, i.e., the tool pot, with the outer link plate, similarly to the tool holding and conveying chain 500 described above, there is a chain in which planar portions that fit with each other are formed respectively at an outer circumference of a link plate inserting portion of the tool pot and at an inner circumference of tool pot inserting hole of either an inner link plate or an outer link plate, Japanese Utility Model Application Laid-open No. Sho.63-76437 (Whole Pages, Whole Drawings) for example.

However, the tool holding and conveying chain 500 described above has several disadvantages. Because the chain 500 uses the holder guide 550 and fastening means 560 (composed of a bolt and a nut) to fix the holder guide 550 to prevent turning of the region connecting the cylindrical connecting pin, i.e., the tool pot 530, with the outer link plate 510, there is a possibility that the fastening means 560 will break due to an excessive torque applied when the chain 500 is on a driving sprocket of the auto-tool changer.

The chain 500 also has other cumbersome problems. For example, the number of parts such as the holder guide 550 and the fastening means 560 increases with every link. The outer link plate 510 must be provided with a tap hole and the like to fix those parts to the chain 500. In addition, the burdens of positioning the parts in order to install the holder guide 550 and others is burdensome. Plus, there is a need to maintain and manage the necessary fastening torque.

The latter tool holding and conveying chain (Japanese Utility Model Application Laid-open No. Sho.0.63-76437) exhibits its function of preventing the region connecting the cylindrical connecting pin, i.e., the tool pot, from turning with the outer link plate by forming the planar portions that fit with each other at the outer circumference of the link plate inserting portion of the tool pot and at the inner circumference of the tool pot inserting hole of either the inner link plate or the outer link plate as described above. However, this chain has a problem. Because of the weight of the tool attached to the tool pot and others, the tool pot is eccentrically located vertically, for example, within the tool pot inserting hole of the outer link plate. This causes positional misalignment from a normal mounting position. This positional misalignment from the normal mounting position possibly causes trouble in trying to attach and remove the tool into and out of the tool pot securely and smoothly.

Still more, because the planar portion described above is formed at the region of the hole orthogonal to a center line connecting centers of the tool pot inserting holes, and because the eccentric load caused by the tool pot is generated within the tool pot inserting hole of the outer link plate due to the positional misalignment from the normal mounting position, there is tensile stress in a chain longitudinal direction that is concentrated only to the planar portion without dispersing to the whole circumference of the tool pot inserting hole. Consequently, the long-term durability of the outer link plate cannot be assured.

SUMMARY OF THE INVENTION

Accordingly, embodiments of the present invention aim at solving the aforementioned prior art problems by providing a tool holding and conveying chain adapted to securely lock and to accurately position a tool pot, i.e., a connecting pin, to a pin hole of either an outer link plate or an inner link plate so that the tool pot does not turn and to achieve steady and smooth attachment and removal of a tool into and out of the tool pot with a simple attachment structure.

In order to solve the aforementioned problems, according to a first aspect of the invention, a tool holding and conveying chain having outer link plates, inner link plates and connecting pins for alternately connecting the outer link plates with the inner link plates and adapted as tool pots for removably holding and conveying tools is provided. In the chain, the tool pot has a pair of positioning flat portions formed by cutting a link plate attaching an outer circumferential region of the tool pot in the pot axial direction so as to face with each other on a pot outer peripheral side.

Either the outer link plate or the inner link plate has pin holes in each of which a pair of positioning cooperative flat portions are formed so as to bulge out from an inner circumference towards a center of the pin hole so as to face each other on an inner peripheral surface of the pin hole.

The positioning flat portions of the tool pot are fitted into and locked by the positioning cooperative flat portions of the outer or inner link plate when the tool pot is attached in the link plate.

A second aspect of the tool holding and conveying chain of the invention is adapted to solve the aforementioned problems by arranging the chain such that the pair of positioning cooperative flat portions is formed at regions of the pin hole where the positioning cooperative flat portions do not directly intersect with a center line connecting the centers of the pair of pin holes.

A third aspect of the tool holding and conveying chain of the invention is adapted to solve the aforementioned problems by arranging the chain such that the pairs of positioning cooperative flat portions are formed lengthwisely symmetrically in the plate longitudinal direction in the pair of pin holes disposed in either the outer link plate or the inner link plate.

A fourth aspect of the tool holding and conveying chain of the invention is adapted to solve the aforementioned problems by arranging the chain such that the pairs of positioning cooperative flat portions are formed lengthwisely symmetrically in the plate longitudinal direction in the pair of pin holes disposed in either the outer link plate or the inner link plate.

According to an embodiment of the tool holding and conveying chain of the invention, because the connecting pins for connecting the outer link plates alternately with the inner link plates are adapted as the tool pots, the tool holding and conveying chain is capable of not only removably holding and conveying tools, but also bringing about the following peculiar advantageous effects.

By way of example only, the first aspect of the tool holding and conveying chain of the invention has such advantageous effects that the positioning flat portions of the tool pot butt the positioning cooperative flat portions of the pin hole and relative movement of the tool pot with the pin hole is blocked. More specifically, because the tool pot in the chain has the pair of positioning flat portions formed by cutting the link plate attaching outer circumferential region of the tool pot in the pot axial direction so as to face with each other on the pot outer peripheral side, either the outer link plate or the inner link plate has the pair of positioning cooperative flat portions formed so as to bulge out from the inner circumference to the center of the pin hole so as to face with each other on the pin hole inner peripheral surface. The positioning flat portions of the tool pot are fitted into and locked by the positioning cooperative flat portions of the outer or inner link plate when the tool pot is attached in the link plate.

Still more, because the positioning flat portions of the tool pot block the mutual positional misalignment of the tool pot and the pin hole in cooperation with the positioning cooperative flat portions of the pin holes, it becomes possible to securely lock the tool pot, i.e., the connecting pin, to the pin hole of either the outer link plate or the inner link plate. In addition, the tool pot does not turn and the tool can be securely and smoothly attached into and removed out of the tool pot by accurately positioning the tool pot into the pin hole by the simple attachment structure without using a holder guide and fastening means of the prior art tool holding and conveying chain, i.e., without increasing the number of parts.

At least the second aspect of the tool holding and conveying chain of the invention has advantageous effects and features. For example, because the pair of positioning cooperative flat portions is formed at the regions of the pin hole where the positioning cooperative flat portions do not directly intersect with the center line connecting the centers of the pair of pin holes, the positioning cooperative flat portions of the pin holes butt the positioning flat portions of the tool pot and fully exhibit a function of blocking the relative movement of the link plate and the tool pot centering on the pin hole without directly receiving tensile stress in the chain longitudinal direction. Accordingly, the tool holding and conveying chain of the invention can assure excellent chain tensile strength and durability for a long period of time.

At least the third aspect of the tool holding and conveying chain of the invention has advantageous effects. For example, because the pairs of positioning cooperative flat portions are formed lengthwisely symmetrically in the plate longitudinal direction in the pair of pin holes disposed in either the outer link plate or the inner link plate, it becomes possible to assemble the chain at random without distinguishing the front and rear directions of the outer link plate or the inner link plate in which the pair of positioning cooperative flat portions is formed similarly to the inner link plate. Accordingly, it becomes possible to avoid an increase in the burden of assembly works otherwise caused by assembling the wrong plates in terms of longitudinally front and rear directions.

At least the fourth aspect of the tool holding and conveying chain of the invention has advantages. For example, because the pairs of positioning cooperative flat portions are formed lengthwisely symmetrically in the plate longitudinal direction in the pair of pin holes disposed in either the outer link plate or the inner link plate, it becomes possible to vary an angle for attaching the tool pot between the front and rear pin holes in the plate longitudinal direction of the outer link plate or the inner link plate in which the pair of positioning cooperative flat portions is formed. Accordingly, it becomes possible to assure twofold attachment angle patterns by one type of tool pot and to widen an applicable range of usable tools.

BRIEF DESCRIPTION OF DRAWINGS

FIG. 6A illustrates an outline of an outer link plate and FIG. 6B illustrates an outline of an inner link plate;

FIG. 8A illustrates an outline of an outer link plate and FIG. 8B illustrates an outline of an inner link plate;

FIG. 11 schematically shows an alternative arrangement according to the present invention.

DETAILED DESCRIPTION

Embodiments

Embodiments of a tool holding and conveying chain of the invention will be explained below with reference to FIGS. 1 through 8.

Figure 1:
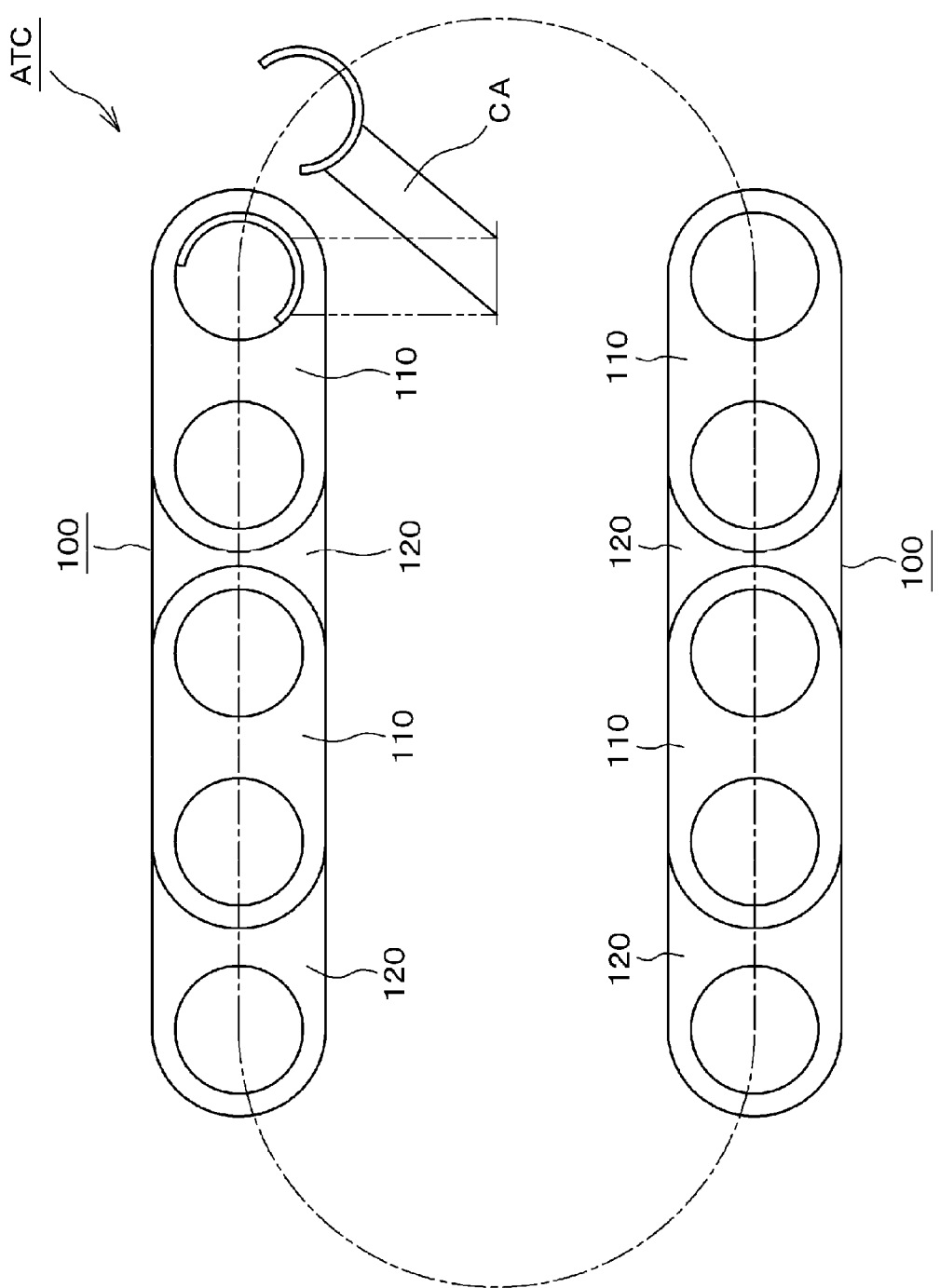
FIG. 1 shows a mode of use of a tool holding and conveying chain according to a first embodiment of the invention.
Figure 2:
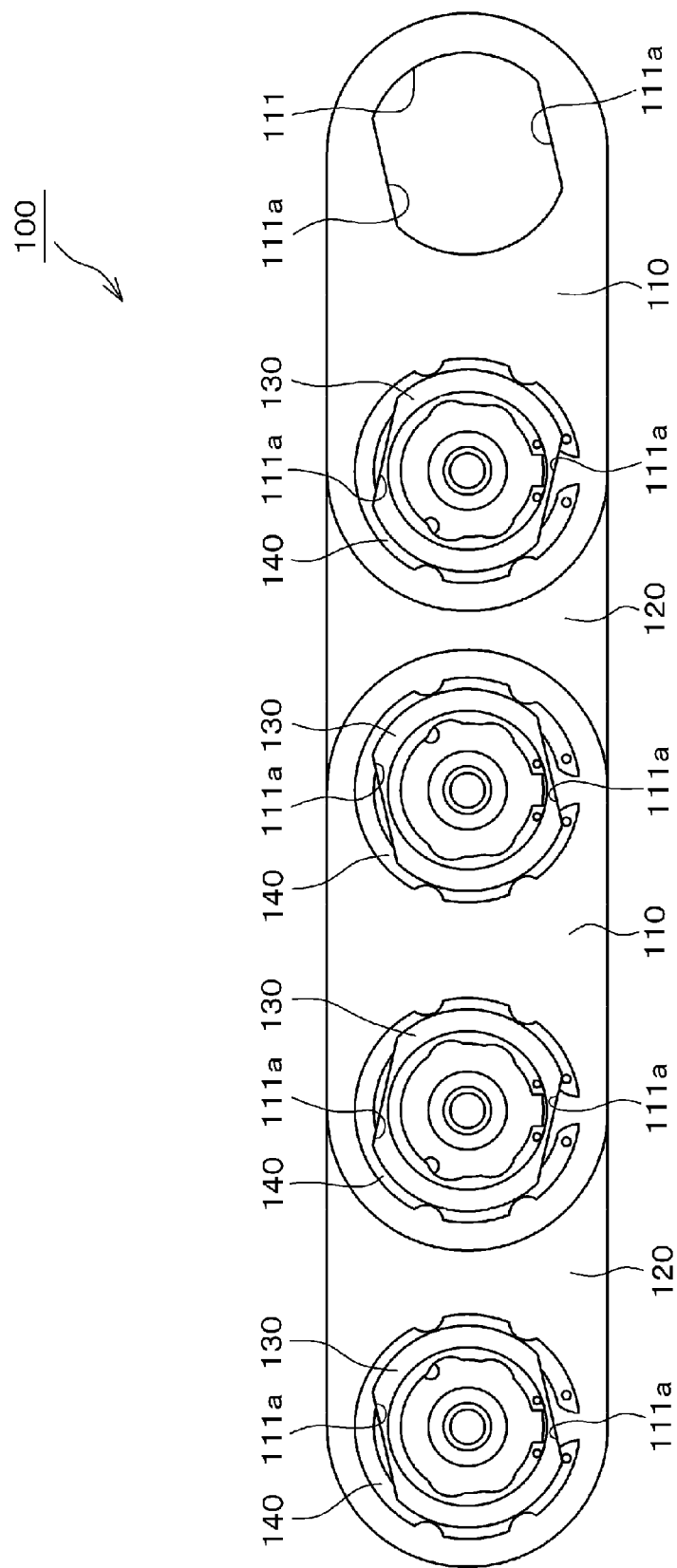
FIG. 2 is a side view of the tool holding and conveying chain of the first embodiment of the invention seen from the opposite side of the tool inserting side (referred to simply as the 'non-tool inserting side' hereinafter)
Figure 3:
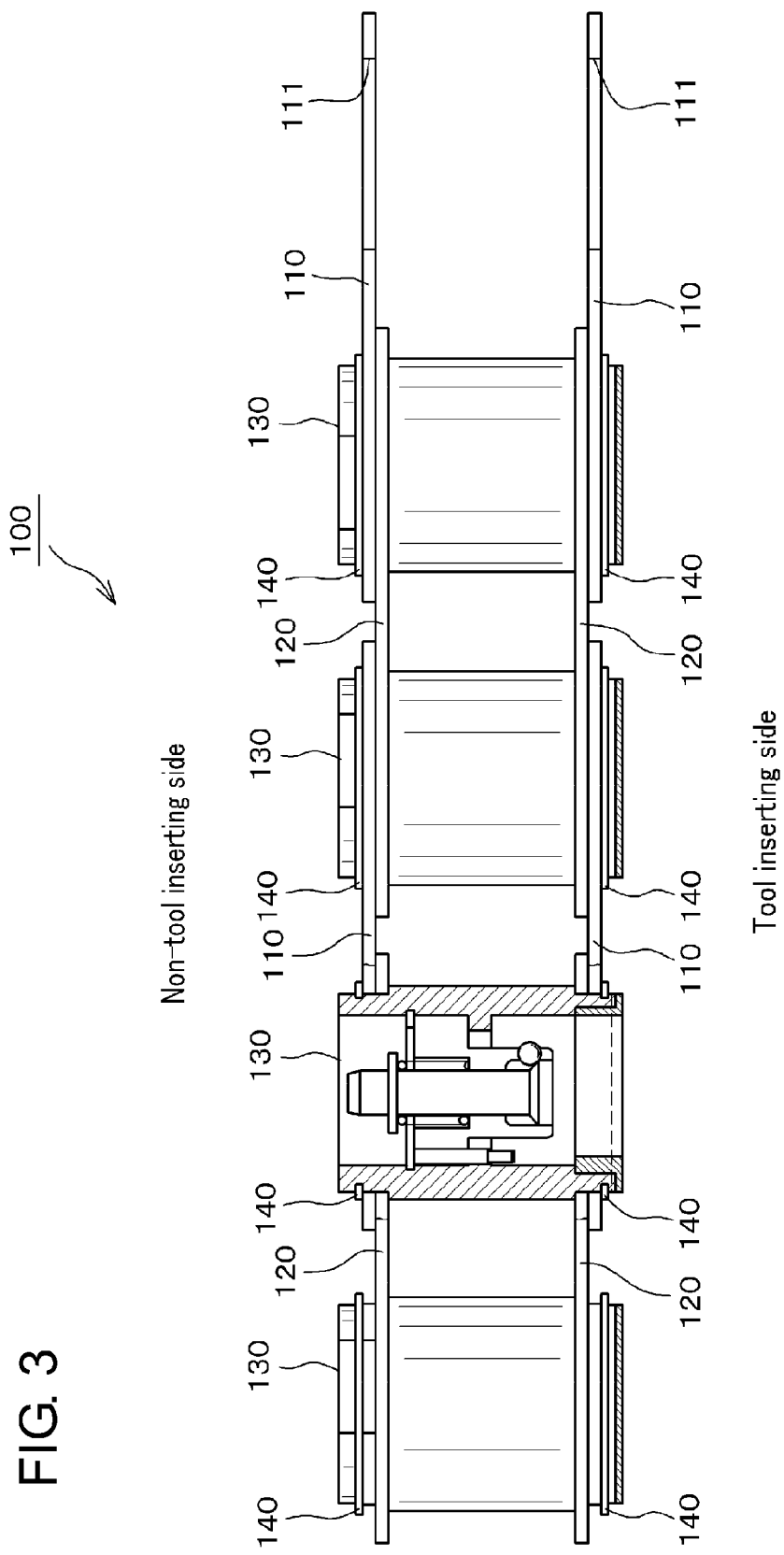
FIG. 3 is a schematic view of the tool holding and conveying chain shown in FIG. 2, where a part thereof is shown in section.
Figure 4:
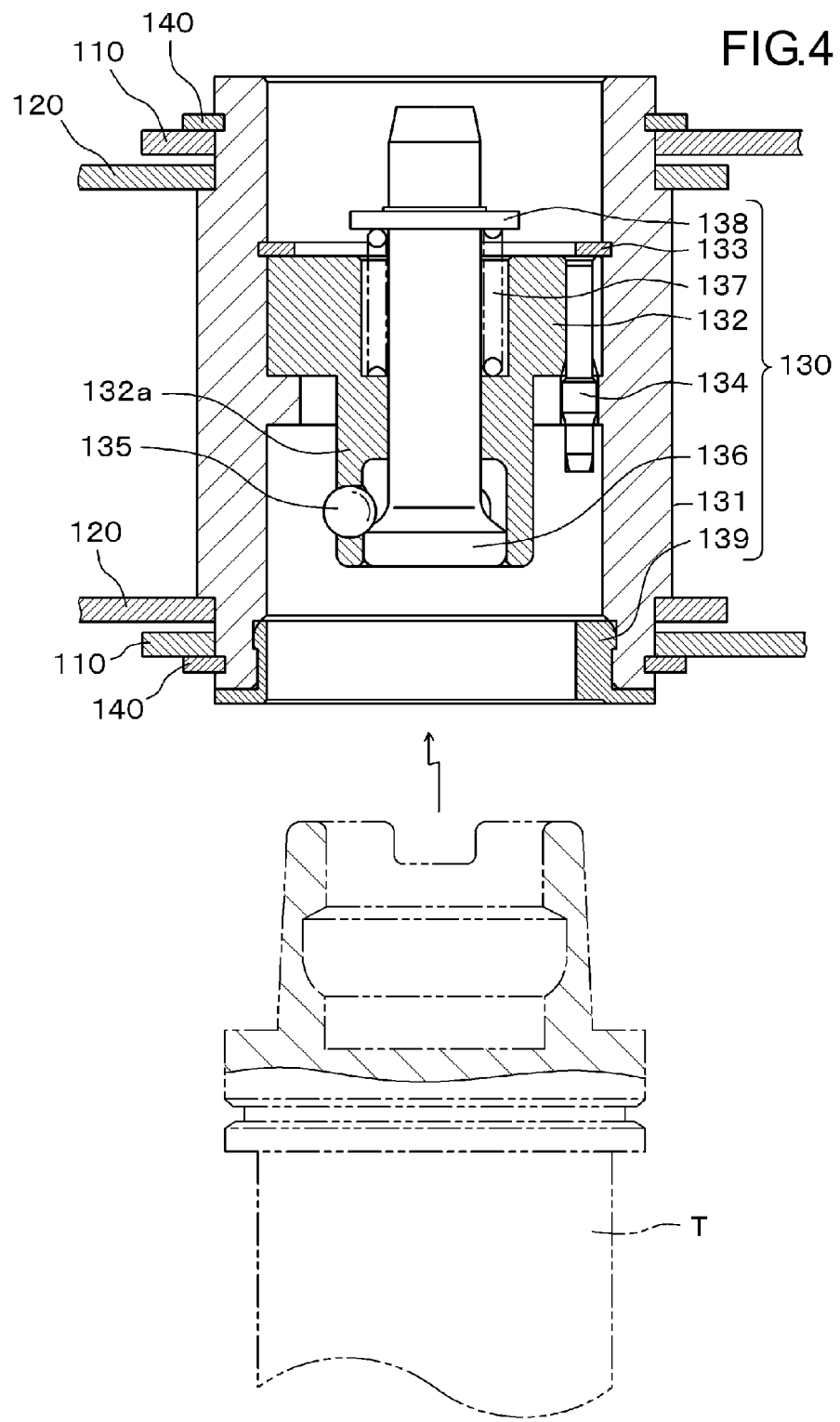
FIG. 4 is an enlarged section view of a tool pot shown in FIG. 3.
Figure 5:
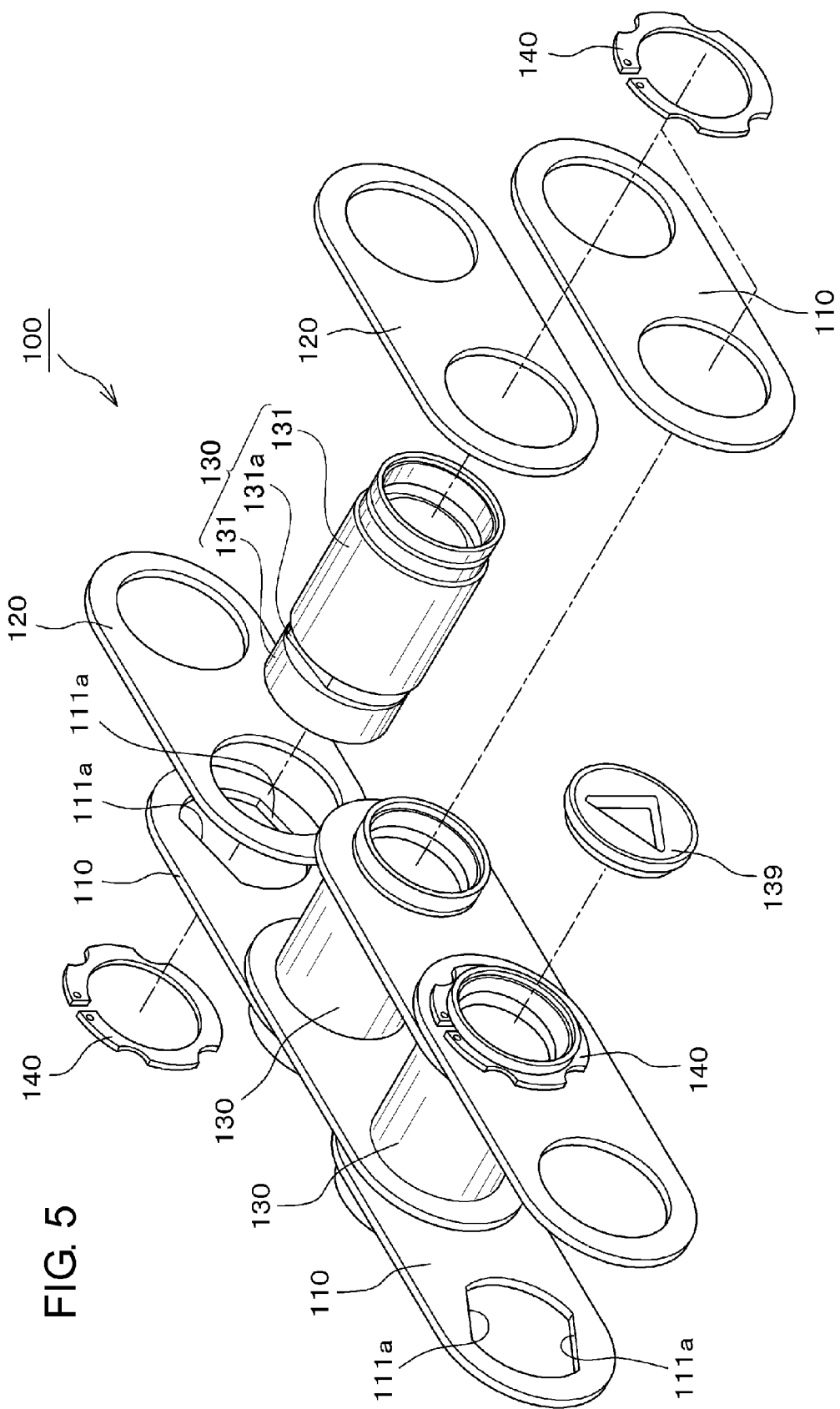
FIG. 5 is an exploded view of the tool holding and conveying chain shown in FIG. 2.
Figure 6A:
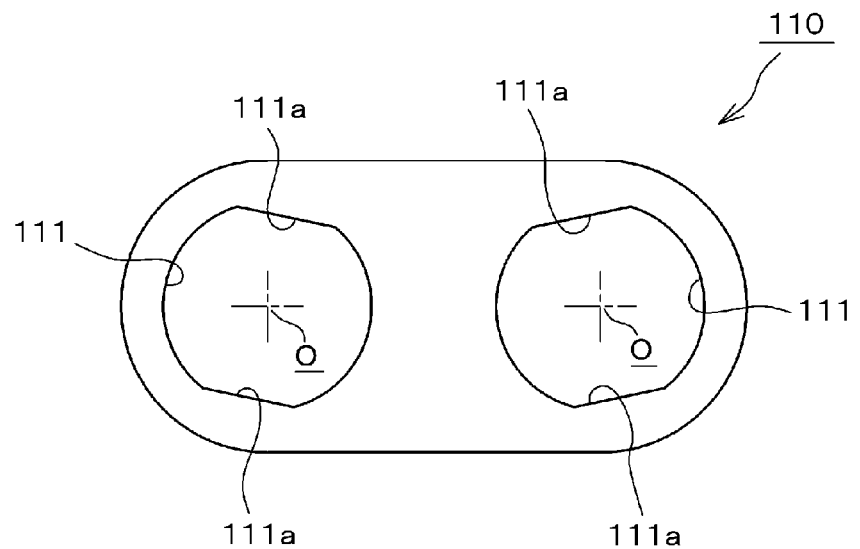
FIGS. 6A and 6B show main parts of the tool holding and conveying chain shown in FIG. 2, where
Figure 6B:
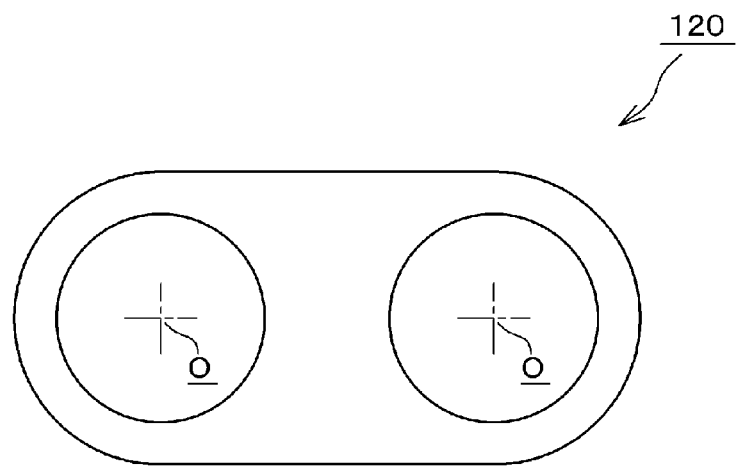
Figure 7A:
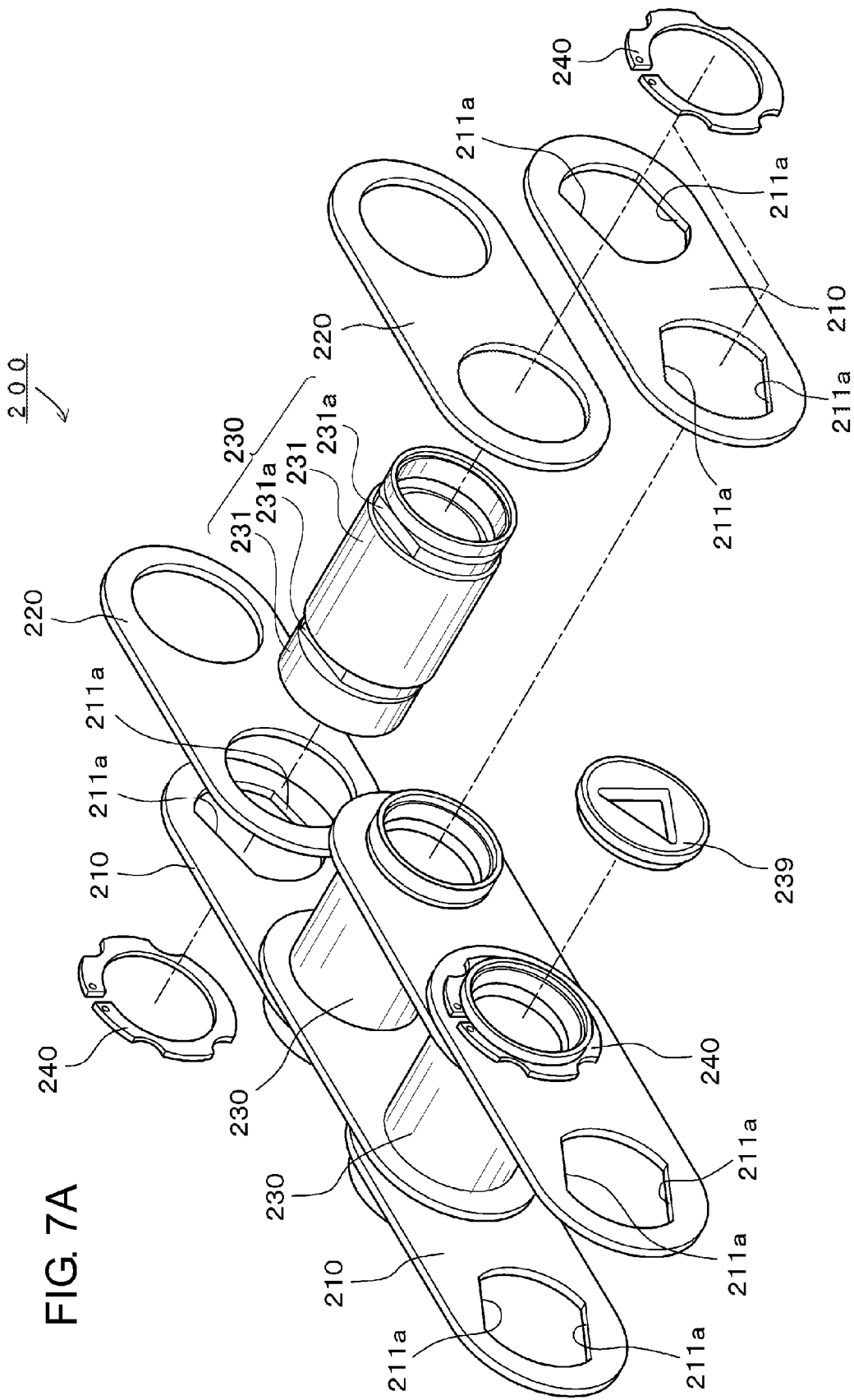
FIG. 7A is an exploded view of a tool holding and conveying chain according to a second embodiment of the invention.
Figure 7B:
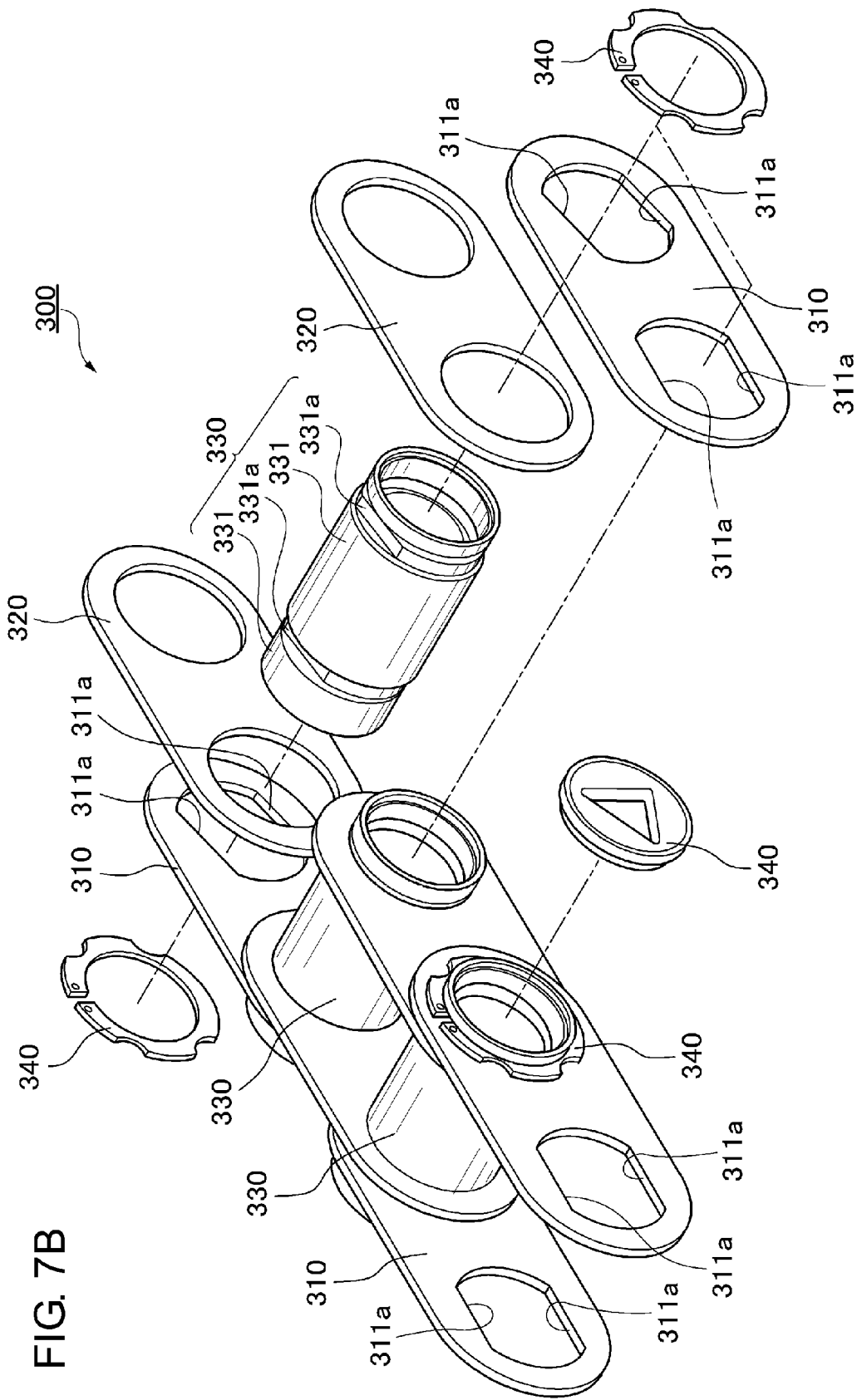
FIG. 7B is an exploded view of a tool holding and conveying chain according to a third embodiment.
Figure 8A:
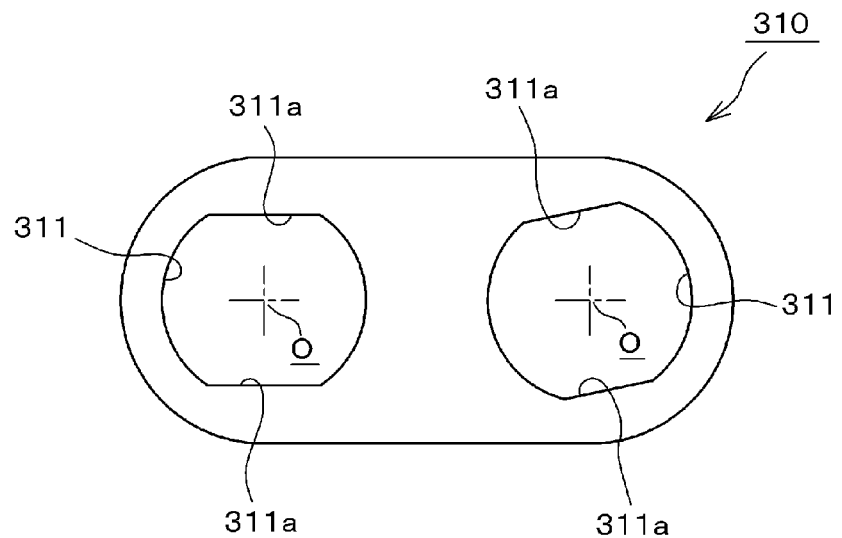
FIGS. 8A and 8B show main parts of a tool holding and conveying chain according to the third embodiment of the invention, where
Figure 8B:
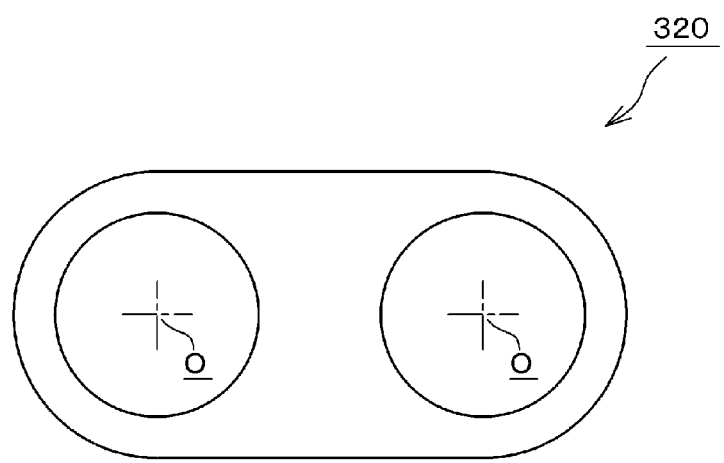
Figure 9:
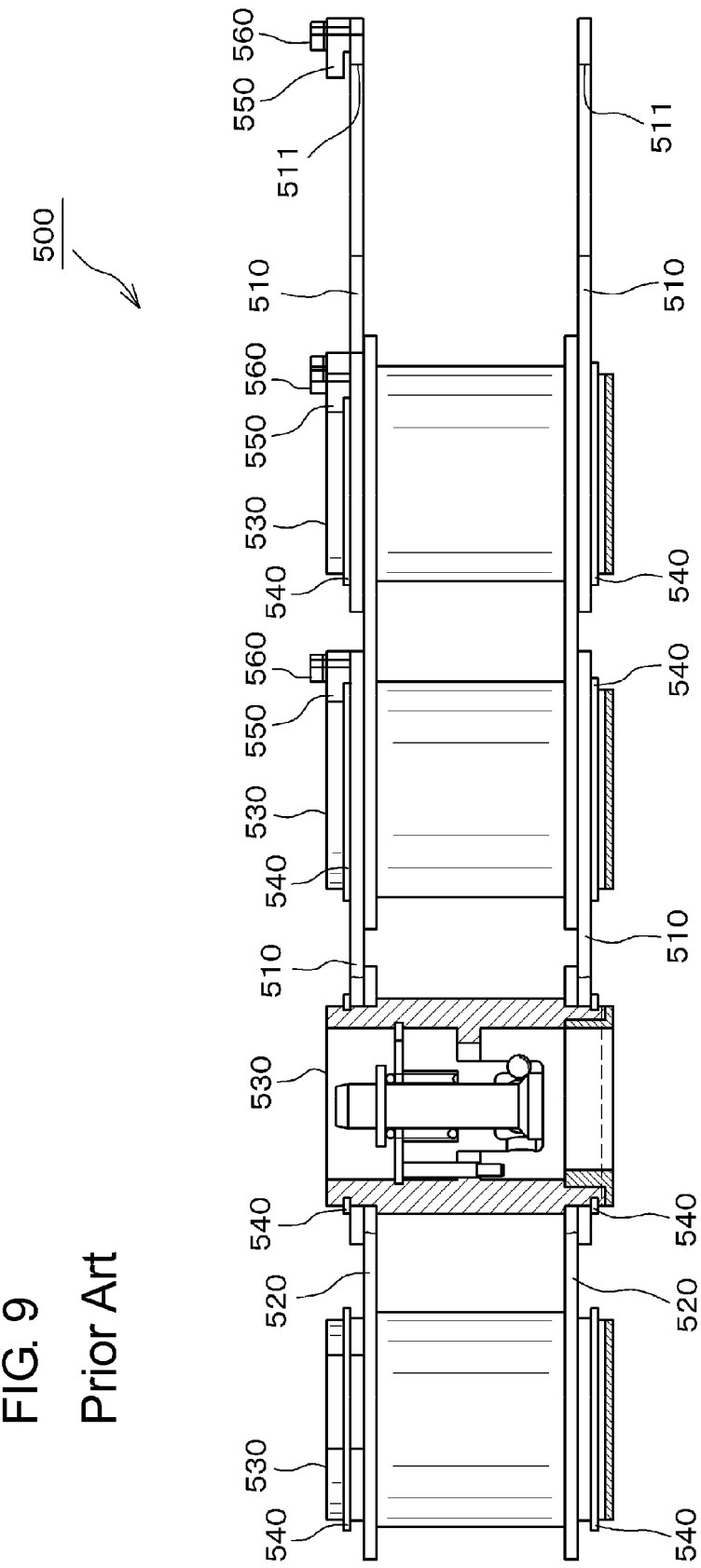
FIG. 9 is a side view of a prior art tool holding and conveying chain seen from the non-tool inserting side.
Figure 10:
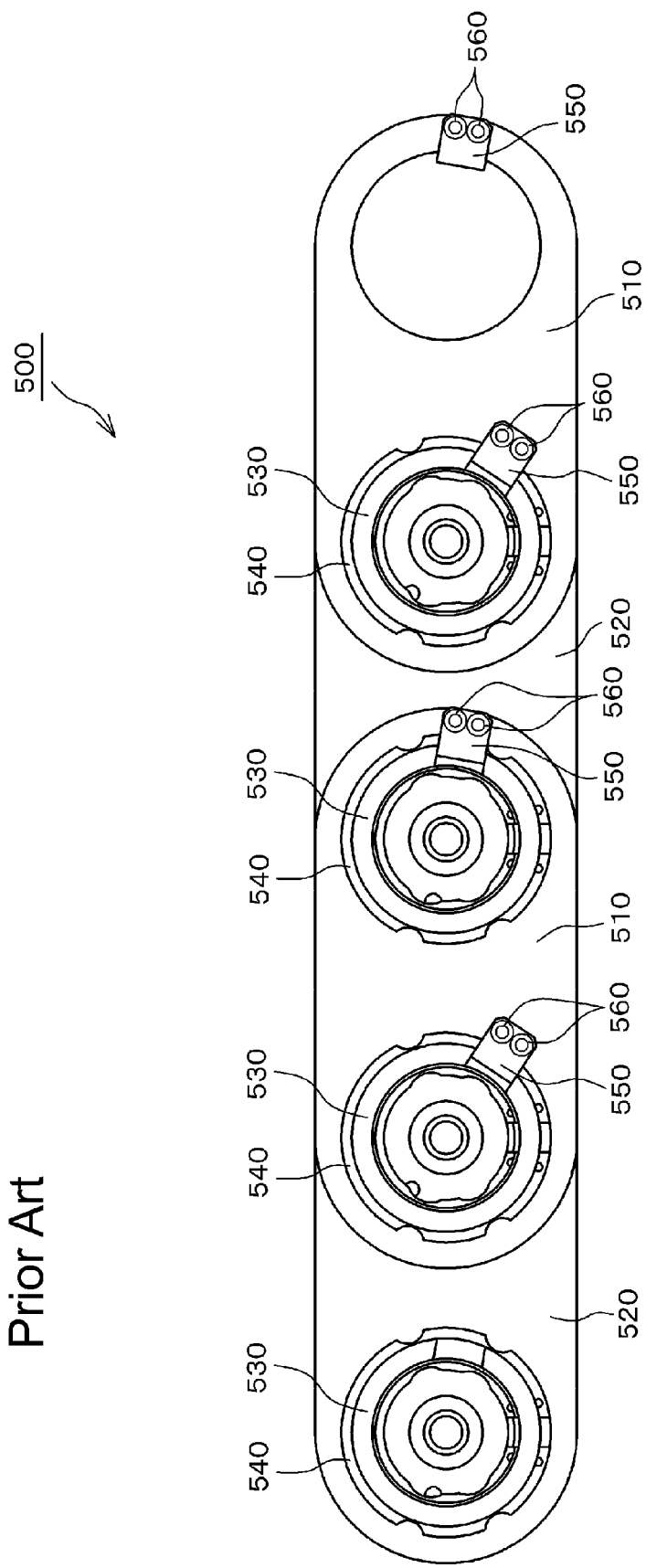
FIG. 10 is a schematic view of the tool holding and conveying chain shown in FIG. 9, wherein a part thereof is shown in section.

FIG. 1 is a diagram illustrating a mode of use of a tool holding and conveying chain according to a first embodiment of the invention, FIG. 2 is a side view of the tool holding and conveying chain of the first embodiment of the invention seen from the non-tool inserting side, FIG. 3 is a schematic view of the tool holding and conveying chain shown in FIG. 2, where a part thereof is shown in section, FIG. 4 is an enlarged section view of a tool pot shown in FIG. 3, FIG. 5 is an exploded view of the tool holding and conveying chain shown in FIG. 2, FIGS. 6A and 6B show main parts of the tool holding and conveying chain shown in FIG. 2, where FIG. 6A illustrates an outline of an outer link plate and FIG. 6B illustrates an outline of an inner link plate, FIG. 7A is an exploded view of a tool holding and conveying chain according to a second embodiment of the invention, FIG. 7B is an exploded view of a tool holding and conveying chain according to a third embodiment of the invention and FIGS. 8A and 8B show main parts of a tool holding and conveying chain according to the third embodiment of the invention, where FIG. 8A illustrates an outline of an outer link plate and FIG. 8B illustrates an outline of an inner link plate.

As shown in FIG. 1, one embodiment of a tool holding and conveying chain 100 is used in an auto-tool changer (ATC) mounted in a machining tool such as a machining center to hold and convey a large number of tools. It is noted that a conveyance layout of the tool holding and conveying chain 100 of the present embodiment is not limited to what is shown in FIG. 1 and may be modified corresponding to types and number of tools mounted in the auto-tool changer ATC. It is also possible to dispose corner rollers, idler rollers, sprockets and others as necessary.

FIG. 1 also shows a tool replacing arm CA for replacing a desirable tool between the tool holding and conveying chain 100 for holding and conveying tools and a machining tool not shown.

As shown in FIGS. 2 through 5, the tool holding and conveying chain 100 of the present embodiment has pairs of right and left outer link plates 110, pairs of right and left inner link plates 120 and connecting pins 130 (also referred to herein as tool pots 130) for alternately connecting the outer link plates with the inner link plates. The connecting pins can be adapted as tool pots.

Each of the connecting pins or tool pots 130 may be configured to removably hold a tool T therein. Each of the connecting pins 130 has a pair of positioning flat portions 131a formed by cutting a link plate attaching outer peripheral region of the tool pot 130 in the pot axial direction so as to face with each other on a pot outer peripheral surface 131. The outer link plate on the non-tool inserting side of the pair of right and left outer link plates 110 disposed in the chain widthwise direction of the chain has a pin hole 111 in which a pair of positioning cooperative flat portions 111a is formed so as to bulge out of an inner circumference to the center of the pin hole 111 and to face with each other on a pin hole inner peripheral surface.

In a state in which the tool pot 130 is attached in the outer link plate 110, the positioning flat portions 131a of the tool pot 130 butt the positioning cooperative flat portions 111a of the pin hole 111, so that the positioning flat portions 131a block their relative movement around the center O of the pin hole and block mutual positional misalignment of the outer link plate 110 and the tool pot 130 in cooperation with the positioning cooperative flat portions 111a of the pin hole 111.

Then, the tool pot 130, i.e., the connecting pin described above, is provided with a pull stud fitting 132 for removably anchoring the tool T shown by imaginary lines in FIG. 4. The pull stud fitting 132 holds the tool T so that the tool cannot be turned by anchoring the tool T around a small-diameter cylindrical portion 132a of the fitting 132.

Here, as shown in FIG. 4, the tool pot 130 has a retaining ring 133 for fixing the pull stud fitting 132 within the tool pot 130, a positioning parallel pin 134 for positioning the tool pot 130 and the pull stud fitting 132 to block them from moving relatively with each other, a steel ball 135 for anchoring a shank end portion of the tool T, a lock pin 136 for pressing the steel ball 135 outward so as to anchor the shank end portion of the tool T, a spring 137 for elastically biasing the lock pin 136, a flat washer 138 for holding the spring 137 and a tapered sleeve 139 provided on the tool inserting side and made of synthetic resin and the like.

It is noted that while the present embodiment describes the pull stud fitting 132 of the type in which the steel ball 135 is biased outwardly from the pot center axial line has been described above, it is possible to adopt a tool holding mechanism of a type in which the steel ball is biased toward the inside of the tool pot to hold the tool outer peripheral side.

Still more, while the tool pot 130 described above has the pair of positioning flat portions 131a formed around the pot outer peripheral side 131 by cutting the link plate attaching outer peripheral region of the tool pot 130 in the pot axial direction so as to face with each other on the pot outer peripheral surface 131 as shown in FIGS. 4 and 5, the tool pot 130 is also provided with a C-ringed stopper 140 for retaining the tool pot 130, i.e., the connecting pin, so that it does not fall out of the pair of right and left outer link plates 110 and the pair of right and left inner link plates 120.

Then, a specific mode for installing the positioning cooperative flat portion 111a, which is the most characteristic part of the tool holding and conveying chain 100 of the first embodiment of the invention, will be explained below in detail with reference to FIGS. 5 and 6.

That is, the pair of positioning cooperative flat portions 111a is formed in regions of the pin holes not directly intersecting with a center line connecting the centers O of the pair of pin holes existing on the outer link plate 110 on the non-tool inserting side among the pair of right and left outer link plates 110 in the tool holding and conveying chain 100 of the first embodiment.

Thereby, the positioning cooperative flat portions of the pin holes butt the positioning flat portions of the tool pot and fully exhibit a function of blocking the relative movement of the link plates and the tool pot around the center O of the pin hole without directly receiving tensile stress in the chain longitudinal direction.

Then, the pairs of positioning cooperative flat portions 111a are formed lengthwisely symmetrically in the plate longitudinal direction in the pair of pin holes 111 disposed on the outer link plate 110 on the non-tool inserting side.

Thereby, it becomes possible to assemble the chain at random without being required to distinguish the front and rear directions of the outer link plate 110 in the plate longitudinal direction in which the pairs of positioning cooperative flat portions 111 are formed, similarly to the inner link plate 120.

As described above, the tool holding and conveying chain 100 of the first embodiment thus obtained has the pair of positioning flat portions 131a formed by cutting the link plate attaching peripheral region of the tool pot 130 in the pot axial direction so that they face with each other on the pot outer peripheral side 131. The pair of positioning cooperative flat portions 111a are formed so as to bulge out of the inner circumference to the center of the pin hole 111 of the outer link plate 110 on the non-tool inserting side among the pair of right and left outer link plates 110 disposed in the chain widthwise direction so that they face with each other on the pin hole inner peripheral surface. The pairs of positioning cooperative flat portions 111a are formed lengthwisely symmetrically in the plate longitudinal direction at the regions of the pin holes where the center line connecting the centers O of the pair of pin holes existing in the outer link plate 110 on the non-tool inserting side.

Accordingly, the tool holding and conveying chain 100 of the first embodiment can securely lock the tool pot 130, i.e., the connecting pin, to the pin hole 111 of the outer link plate 110 so that the tool pot does not turn. The tool holding and conveying chain 100 allows the tool T to be securely and smoothly attached in and removed out of the tool pot 130 by accurately positioning the tool pot 130 into the pin hole 111 by the simple attachment structure without using a holder guide and fastening means of the prior art tool holding and conveying chain, i.e., without increasing the number of parts.

Thus, the tool holding and conveying chain 100 of the present embodiment has such remarkable effects that it can suppress an increase of burden of assembly works otherwise caused by assembling the wrong plates in terms of the longitudinally front and rear directions. Embodiments can also assure excellent chain tensile strength and durability for a long period of time.

Next, a tool holding and conveying chain 200 of a second embodiment of the invention will be explained with reference to FIG. 7A. Here, the tool holding and conveying chain 200 of the second embodiment is different from the tool holding and conveying chain 100 of the first embodiment only in the specific installation mode of the positioning flat portions and positioning cooperative flat portions. The other chain structures are the same. Accordingly, the same parts with those of the tool holding and conveying chain 100 of the first embodiment will be denoted by reference numerals in 200s by replacing from those of 100s of the first embodiment and their explanation will be omitted here.

Then, the specific installation mode of the positioning flat portion and the positioning cooperative flat portion, which is the most characteristic part of the tool holding and conveying chain 200 of the second embodiment of the invention will be explained in detail with reference to FIG. 7A.

According to the tool holding and conveying chain 200 of the second embodiment, the positioning flat portions 231a are formed by cutting the link plate attaching outer peripheral regions on the tool inserting side and the non-tool inserting side of the tool pot 230 so as to face with each other on the pot outer peripheral side 231. The positioning cooperative flat portions 211a are formed so as to bulge out of an inner circumference to a center O of each pin hole 211 of the pair of right and left outer link plates 210 disposed in the chain widthwise direction, i.e., the outer link plates 210 disposed on the tool inserting side and the non-tool inserting side, so as to face with each other on the pin hole inner peripheral surface.

Then, in a state when the tool pot 230 is attached in the pair of right and left outer link plates 210, the positioning flat portions 231a of the tool pot 230 butt the positioning cooperative flat portions 211a of the pin hole 211 and block the relative movement around the center O of the pin hole and the positioning flat portions 231a of the tool pot 230 blocks mutual positional misalignment of the outer link plates 210 and the tool pot 230 in cooperation with the positioning cooperative flat portions 211a of the pin hole 211.

As described above, the tool holding and conveying chain 200 of the second embodiment has the positioning flat portions 231a that are disposed so as face with each other on the pot outer peripheral side 231 on the tool inserting side and the non-tool inserting side of the tool pot 230 and the positioning cooperative flat portions 211a that are disposed so as to face with each other on the respective pin holes 211 of the outer link plates 210 disposed on the tool inserting side and the non-tool inserting side, respectively, and the pair of positioning cooperative flat portions 211a are formed lengthwisely symmetrically in the plate longitudinal direction at the regions of the pin hole not directly intersecting with the center line connecting the centers O of the pair of pin holes existing in the outer link plate 210 on the non-tool inserting side and the tool inserting side.

Accordingly, it becomes possible to assure strong fitting strength when the connecting pin, i.e., the tool pot 230, is attached, to securely lock the tool pot 230 to the pin hole 211 of the outer link plate 210 so that the tool pot 230 does not turn. It is possible to securely and smoothly attach the tool T to and remove the tool T out of the tool pot 230 by accurately positioning the tool pot 230 into the pin hole 211 by the simple attachment structure without using a holder guide and fastening means of the prior art tool holding and conveying chain, i.e., without increasing the number of parts.

Thus, the tool holding and conveying chain 200 of the present embodiment has such remarkable effects that it can avoid an increase of burden of assembly works otherwise caused by assembling wrong plates in terms of the longitudinally front and rear directions. It can assure excellent chain tensile strength and durability for a long period of time.

Next, a tool holding and conveying chain 300 of a third embodiment of the invention will be explained with reference to FIGS. 7B, 8A and 8B.

Here, the tool holding and conveying chain 300 of the third embodiment is different from the tool holding and conveying chain 100 of the first embodiment only in the specific installation mode of the positioning cooperative flat portions, and the other chain structures are the same. Accordingly, the same parts of the third embodiment with those of the tool holding and conveying chain 100 of the first embodiment will be denoted by reference numerals in 300s by replacing from those of 100s of the first embodiment and their explanation will be omitted here.

Then, the specific installation mode of the positioning flat portion, which is the most characteristic part of the tool holding and conveying chain 300 of the third embodiment of the invention, will be explained in detail with reference to FIGS. 7B, 8A and 8B.

In the tool holding and conveying chain 300 of the third embodiment, pairs of positioning cooperative flat portions 311a are formed lengthwisely asymmetrically in the plate longitudinal direction, i.e., to be different from each other by inclining the front positioning cooperative flat portions and by keeping the rear positioning cooperative flat portions in parallel with respect to the center line connecting the centers of the pin holes, in the pair of pin holes 311 disposed in the outer link plate 310.

Thereby, it becomes possible to vary angles for attaching the tool pot 330 between the front and rear pin holes in the plate longitudinal direction of the outer link plate 310 in each of which the pair of positioning cooperative flat portions 311*a* is formed.

The tool holding and conveying chain 300 of the third embodiment obtained as described above has such remarkable effects that it becomes possible to assure two types of attachment angle patterns by one type of tool pot 330 and to widen an applicable range of usable tools T because the pairs of positioning cooperative flat portions 311*a* are formed lengthwisely asymmetrically in the plate longitudinal direction in the pair of pin holes 311 disposed in the outer link plate 310, in addition to the effects brought out by the tool holding and conveying chain 100 of the first embodiment described above.

The specific mode of the tool holding and conveying chain of the present invention may take any mode as long as the tool holding and conveying chain has the outer link plates, inner link plates and connecting pins for alternately connecting the outer link plates with the inner link plates and adapted as the tool pots for removably holding tools therein to convey the tools. The tool holding and conveying chain is arranged such that the tool pot has the pair of positioning flat portions formed by cutting the link plate attaching outer circumferential region of the tool pot in the pot axial direction so as to face with each other on the pot outer peripheral side. Either the outer link plate or the inner link plate has the pair of positioning cooperative flat portions formed so as to bulge out from the inner circumference to the center of the pin hole so as to face with each other on the pin hole inner peripheral surface. The positioning flat portions of the tool pot are fitted into and locked by the positioning cooperative flat portions of the outer or inner link plate when the tool pot is attached in the link plate, so that the tool pot, i.e., the connecting pin, is securely locked by and accurately positioned to the pin hole of either the outer link plate or the inner link plate so that the tool pot does not to turn and to achieve steady and smooth attachment and removal of the tool into and out of the tool pot with the simple attachment structure.

That is, the specific installation mode of the positioning cooperative flat portions formed in the outer link plate or the inner link plate of the invention may be any mode as long as the positioning cooperative flat portions are formed in the pin holes of either the outer link plate or the inner link plate so that the outer link plate can turn relative to the inner link plate. Specifically, if the positioning cooperative flat portions are formed in the pin hole of one plate or both plates of the pair of right and left outer link plates disposed in the chain widthwise direction, it becomes possible to assure more rigid fitting strength in attaching the tool pot, i.e., the connecting pin, as compared to one in which the positioning cooperative flat portions are formed in the pin hole of one plate or both plates of the pair of right and left inner link plates disposed in the chain widthwise direction. More preferably, if the positioning cooperative flat portions are formed on the non-tool inserting side of the pair of right and left outer link plates disposed in the chain widthwise direction, the positioning cooperative flat portions exhibit the more secure turn-preventing effect and the stable positioning effect in attaching the tool pot, i.e., the connecting pin, as compared to one formed on the tool inserting side of the pair of right and left outer link plates disposed in the chain widthwise direction.

It is also preferable to form the pairs of positioning cooperative flat portions of the invention in the regions of the pin holes not directly intersecting with the center line connecting the centers of the pair of pin holes in order to assure the excellent chain tensile strength and durability for a long period of time and may be formed in parallel with or aslant to the plate longitudinal direction. It is noted that when the positioning cooperative flat portions are formed aslant to the plate longitudinal direction, they may be formed so as to have different inclination angles from each other in the plate longitudinal direction in the pair of pin holes disposed either in the outer link plate or the inner link plate.

The pairs of positioning cooperative flat portions of the invention may be formed lengthwisely symmetrically or to be lengthwisely asymmetrically in the plate longitudinal direction in the pair of pin holes disposed either in the outer link plate or the inner link plate. In the case of the former, it becomes possible to assemble the chain at random without distinguish the front and rear direction of the outer link plate or the inner link plate in which the pairs of positioning cooperative flat portions are formed. In the case of the latter, it becomes possible to vary angles for attaching the tool pot between the front and rear pin holes in the plate longitudinal direction of the outer link plate or the inner link plate in which the positioning cooperative flat portions are formed.

What is claimed is:

1. A tool holding and conveying chain, comprising:
outer link plates;
inner link plates; and
connecting pins for alternately connecting said outer link plates with said inner link plates so that the outer and inner link plates alternate along a length of the chain, and the connecting pins being adapted as tool pots for removably holding and conveying tools, each tool pot being configured to receive a respective tool that is inserted therein along a tool insertion direction;
each said tool pot having a pair of positioning flat portions formed by cutting a link plate attaching outer circumferential region of said respective tool pot at a common location along the tool insertion direction so as to be located on opposite sides of a center axis of the respective tool pot on an outer periphery of the respective tool pot; and
either each said outer link plate or each said inner link plate has pin holes, in each of which pin holes a pair of positioning cooperative flat portions are formed so as to be located on opposite sides of a center axis of the respective pin hole on an inner peripheral surface of the respective pin hole;
said positioning flat portions of each said tool pot being fitted into a respective one of the pin holes and being locked by said positioning cooperative flat portions of said respective one of the pin holes when each said tool pot is attached in said respective one of the pin holes.

2. The tool holding and conveying chain according to claim 1, wherein each said pair of positioning cooperative flat portions of a respective one of said pin holes is formed such that each said positioning cooperative flat portion of the respective pair does not intersect with the respective center axis of the respective one of said pin holes.

3. The tool holding and conveying chain according to claim 1, wherein either each said outer link plate or each said inner link plate includes a pair of said pin holes, each said pin hole of each said pair of pin holes having a respective said pair of positioning cooperative flat portions, and wherein one respective said pair of positioning cooperative flat portions of one of said pin holes of said pair of pin holes is formed lengthwisely symmetrically in a longitudinal direction of the respective link plate with respect to the other pair of positioning cooperative flat portions of the other pin hole of said pair of pin holes of the respective link plate.

4. The tool holding and conveying chain according to claim 1, wherein either each said outer link plate or each said inner link plate includes a pair of said pin holes, each said pin hole of each said pair of pin holes having a respective said pair of positioning cooperative flat portions, and wherein one respective said pair of positioning cooperative flat portions of one of said pin holes of said pair of pin holes is formed lengthwisely asymmetrically in a longitudinal direction of the respective link plate with respect to the other pair of positioning cooperative flat portions of the other pin hole of said pair of pin holes of the respective link plate.

* * * * *